(No Model.) 2 Sheets—Sheet 2.
P. L. KIMBALL.
CENTRIFUGAL SEPARATOR.
No. 565,281. Patented Aug. 4, 1896.
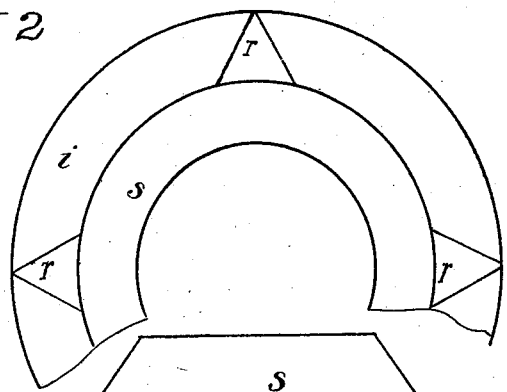
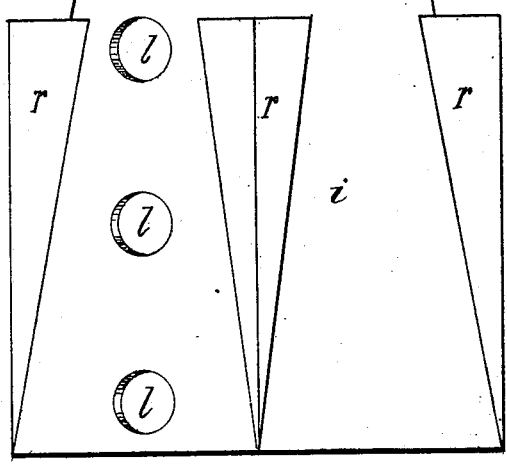
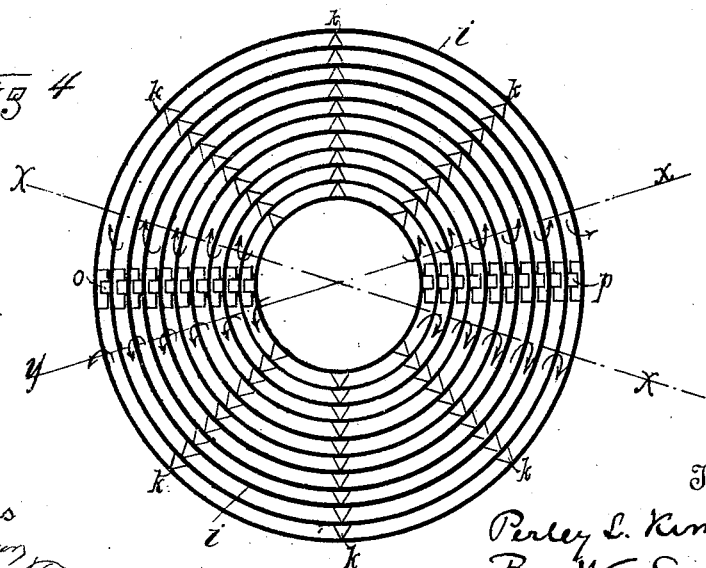
Witnesses
J. R. Thompson
Andrew Ferguson
Inventor
Perley L. Kimball
By W. E. Simonds
Attorney

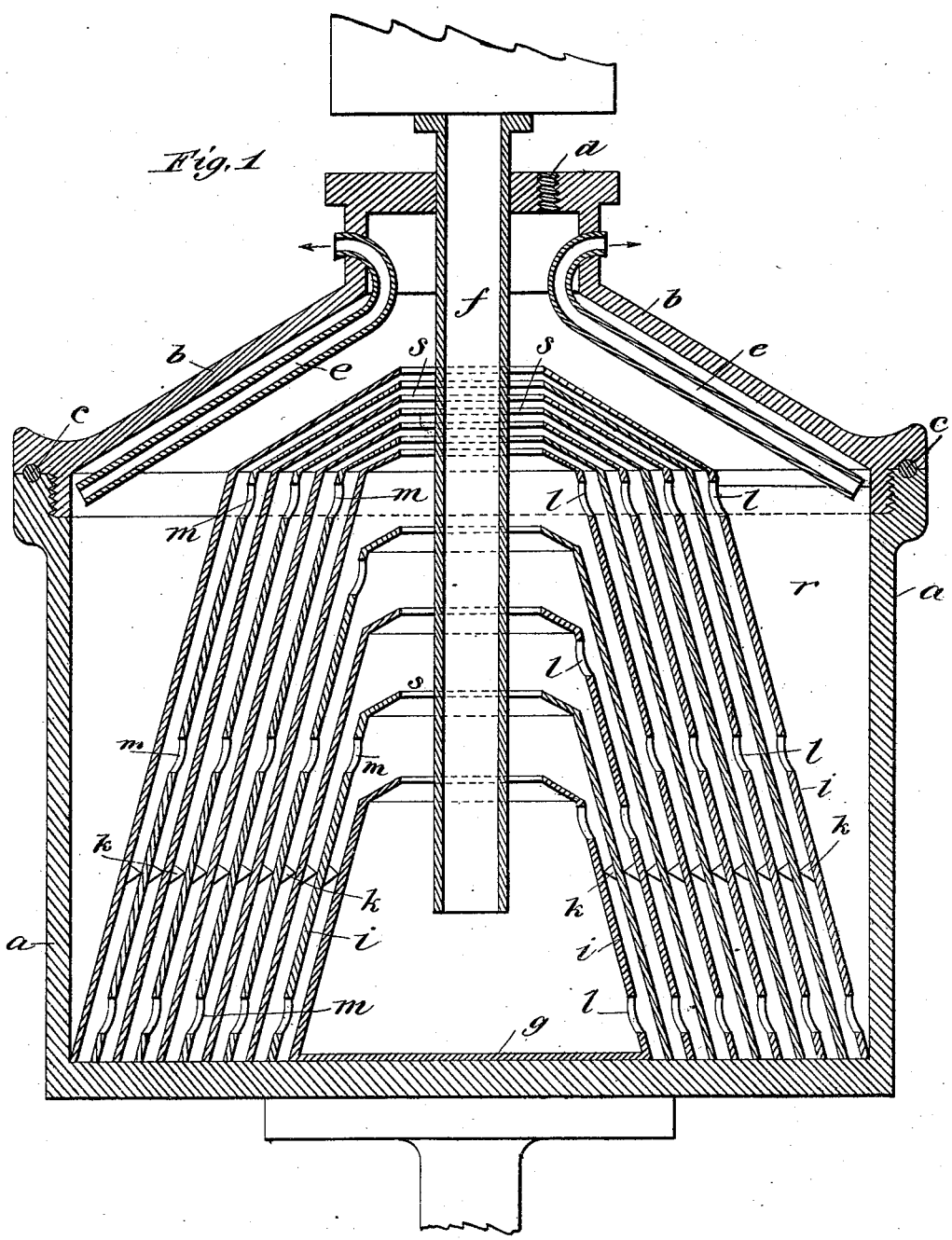

UNITED STATES PATENT OFFICE.

PERLEY L. KIMBALL, OF BELLOWS FALLS, VERMONT, ASSIGNOR TO THE VERMONT FARM MACHINE COMPANY, OF SAME PLACE.

CENTRIFUGAL SEPARATOR.

SPECIFICATION forming part of Letters Patent No. 565,281, dated August 4, 1896.

Application filed January 5, 1895. Serial No. 533,950. (No model.)

*To all whom it may concern:*

Be it known that I, PERLEY L. KIMBALL, a citizen of the United States of America, residing at Bellows Falls, in the county of Windham and State of Vermont, have invented a certain new and useful Improvement in Centrifugal Separators, of which the following is a description, reference being had to the accompanying drawings, wherein—

Figure 1 is a view in central vertical section of the material parts of a separator-drum embodying said improvement. The plane of the section is denoted by the dotted line $x\ x$, Fig. 4. A vertical section on the plane $y\ y$, Fig. 4, would be substantially the same as Fig. 1. Fig. 2 is a top view, on a different scale from Fig. 1, of the nest of annular partitions which are contained within the drum, showing, of course, only the outermost of these annular partitions. Fig. 3 is a side view of elevation of such nest of annular partitions. Fig. 4 is a bottom view of such nest of annular partitions. The arrows in this view denote the course of the milk.

All the arrows at the right of the center and above the center denote flow-passages $l$. All at the left of the center and above the center denote flow-passages $m$.

The apparatus shown and described herein is applicable to the separation of intermixed liquids of different densities generally, but will be herein described as applied to the separation of cream from whole milk.

The letter $a$ denotes the swiftly-rotating drum; $b$, the cover screwing upon the same; $c$, the rubber packing at the joint between the two; $d$, the cream-outlet; $e$, the blue-milk outlets, and $f$ the feed-pipe where the whole milk enters. The letters $i$ denote partitions, which are annular or substantially annular in form, one within the other. The innermost of these annular partitions has a floor $g$. These annular partitions are separable each from the other and can all be taken out of the drum. They are kept apart by spacing projections $k$, located at numerous suitable points upon the outer surface of each of the annular partitions.

The whole milk enters through the feed-pipe $f$ and escapes therefrom near the bottom of the drum and within the smallest of the annular partitions. Here the separation of the cream from the blue milk begins immediately. The latter, under centrifugal force, tends to move radially outward, thereby forcing the cream toward the center. The blue milk, carrying with it more or less of the unseparated cream-globules, passes through a series of flow-passages $l$ and into the annular chamber, which is between the smallest of the annular partitions and the one next contiguous. Here the blue milk, as before, tends to the outside of this annular chamber, forcing the cream radially inward, and the cream, rising, finds escape at the top of this annular chamber into the central space, which is filled with cream. From the annular chamber just spoken of the blue milk escapes into the next of the annular chambers through the flow-passages $m$, which are out of radial alinement with the flow-passages $l$ and by preference directly opposite the same. Here the milk enters another of the annular chambers and further separation of the cream from the blue milk goes on, the cream rising and escaping to join the central mass of cream and the blue milk passing into the next of the annular chambers through other flow-passages $l$, which are out of radial alinement with the flow-passages $m$ last referred to and by preference directly opposite the same, and thus the process goes on in one annular chamber after another, the cream rising and moving inward to join the cream mass at the center and the blue milk passing from one annular chamber to another through the flow-passages in the annular partitions, which are non-alined as to two contiguous partitions, and, by preference, alternately opposite each other. The foregoing description describes what goes on in one half of the nest of annular partitions on one side laterally of the dams or stops. The process is duplicated in the other half. Finally the blue milk reaches the inner wall of the drum and escapes from the drum through the blue-milk outlet $e$, and if there be any cream separated in this final larger chamber it also rises, moves inward, and joins the central cream mass. The feed of the milk through the feed-pipe $f$ is so regulated that the quantity fed is somewhat less than can radially escape through the flow-passages *l* of the innermost partition, to the end that all of the milk may pass through these flow-passages last mentioned.

The letters *o* denote grooved ways on the inner surface of each of the partitions, and the letters *p* denote corresponding ridges on the outer surface of the partitions, sliding in and coöperating with the grooved ways, and together the ridges and the grooves form dams or stops which prevent the milk in any annular chamber from circulating entirely around the whole of the chamber, and preferably each dam is located next a series of flow-passages.

The letters *r* denote wings on the exterior of the outermost annular partition for aiding in keeping the milk rotating with the drum.

The letters *s* denote flanges at the top or upper end of each of the annular partitions, which serve, for one function, to conduct the cream to or toward the central space of the drum.

I claim as my improvement—

In a centrifugal separator, a plurality of substantially conical partitions, one within the other, all inclined from the vertical in the same general direction with flow-passages for the liquid through the same, non-alined as to two contiguous partitions, and provided with end flanges extending toward the center and at an angle to the said partitions, all substantially as described and for the purposes set forth.

PERLEY L. KIMBALL.

Witnesses:
H. D. RYDER,
FRANK G. DAY.